United States Patent
Zheng et al.

(10) Patent No.: US 9,838,403 B2
(45) Date of Patent: Dec. 5, 2017

(54) SYSTEM AND METHOD FOR IDENTIFYING ABUSIVE ACCOUNT REGISTRATION

(71) Applicant: EXCALIBUR IP, LLC, New York, NY (US)

(72) Inventors: Lei Zheng, Sunnyvale, CA (US); Phil Y. Wang, Sunnyvale, CA (US); Shyam Mittur, San Ramon, CA (US); Prashant Vyas, San Jose, CA (US); Savitha Perumal, Sunnyvale, CA (US)

(73) Assignee: EXCALIBUR IP, LLC, New York, NY (US)

( * ) Notice: Subject to any disclaimer, the term of this patent is extended or adjusted under 35 U.S.C. 154(b) by 644 days.

(21) Appl. No.: 14/450,974

(22) Filed: Aug. 4, 2014

(65) Prior Publication Data
US 2014/0344929 A1  Nov. 20, 2014

Related U.S. Application Data

(63) Continuation of application No. 13/564,378, filed on Aug. 1, 2012, now Pat. No. 8,862,524.

(51) Int. Cl.
*G06F 15/18* (2006.01)
*H04L 29/06* (2006.01)
*G06F 21/31* (2013.01)

(52) U.S. Cl.
CPC ........ *H04L 63/1408* (2013.01); *G06F 21/316* (2013.01); *G06F 2221/2117* (2013.01)

(58) Field of Classification Search
CPC combination set(s) only.
See application file for complete search history.

(56) References Cited

U.S. PATENT DOCUMENTS 8,255,280 B1 * 8/2012 Kay .................. G06F 21/53
705/26.1
8,364,766 B2 * 1/2013 Zheng .................. G06N 7/005
382/124

(Continued)

OTHER PUBLICATIONS

Combating Friend Spam Using Social Rejections Qiang Cao; Michael Sirivianos; Xiaowei Yang; Kamesh Munagala 2015 IEEE 35th International Conference on Distributed Computing Systems Year: 2015 pp. 235-244, DOI: 10.1109/ICDCS.2015.32 IEEE Conference Publications.*

(Continued)

*Primary Examiner* — Michael B Holmes
(74) *Attorney, Agent, or Firm* — James J. DeCarlo; Greenberg Traurig, LLP

(57) ABSTRACT

Disclosed is a system and method for processing account registration by identifying account candidates attempting to open an account as abusive. That is, the present disclosure discusses identifying, and challenging and marking abusive account registration. The present disclosure takes into account users' behaviors on a network and the impact to the cost and/or revenue of the network. The present disclosure is proactive as it allows for actions to be taken at the earliest possible time in the registration process before an account is created. This prevents abusive activity from taking place within the network and effecting services and privileges available to legitimate users. Additionally, the effects of the disclosed systems and methods minimize the negative impacts of abusive activity on normal user accounts.

20 Claims, 7 Drawing Sheets

(56) References Cited

U.S. PATENT DOCUMENTS

| | | | | |
|---|---|---|---|---|
| 8,585,045 B2* | 11/2013 | Zheng | ............ | B41J 3/44 235/441 |
| 8,672,841 B2* | 3/2014 | Merriam | ............ | A61B 17/0231 600/236 |
| 8,725,585 B1* | 5/2014 | Kay | ............ | G06F 21/53 705/26.1 |
| 8,862,450 B2* | 10/2014 | Derfoul | ............ | E21B 43/00 703/10 |
| 8,862,524 B2* | 10/2014 | Zheng | ............ | H04L 63/1408 706/12 |
| 8,868,663 B2* | 10/2014 | Hariharan | ............ | H04L 12/585 709/206 |
| 9,411,291 B2* | 8/2016 | Wang | ............ | G11B 5/00808 |
| 9,478,864 B2* | 10/2016 | Zhao | ............ | H01Q 13/02 |
| 9,577,651 B2* | 2/2017 | Zhao | ............ | H03B 23/00 |

OTHER PUBLICATIONS

Preventing replay attacks on speaker verification systems Jesús Villalba; Eduardo Lleida 2011 Carnahan Conference on Security Technology Year: 2011 pp. 1-8, DOI: 10.1109/CCST.2011.6095943 IEEE Conference Publications.*

Secured Operation Planning on Service Networks Jiann-Gwo Doong; Ching-Song D. Wei Second International Conference on Innovative Computing, Informatio and Control (ICICIC 2007) Year: 2007 pp. 279-279, DOI: 10.1109/ICICIC.2007.510 IEEE Conference Publications.*

Separable and Anonymous Identity-Based Key Issuing A. Sui; S. S. M. Chow; L. C. K. Hui; S. M. Yiu; K. P. Chow; W. W. Tsang; C. F. Chong; K. H. Pun; H. W. Chan 11th International Conference on Parallel and Distributed Systems (ICPADS'05) Year: 2005, vol. 2 pp. 275-279, DOI: 10.1109/ICPADS.2005.263 IEEE Conference Publications.*

* cited by examiner

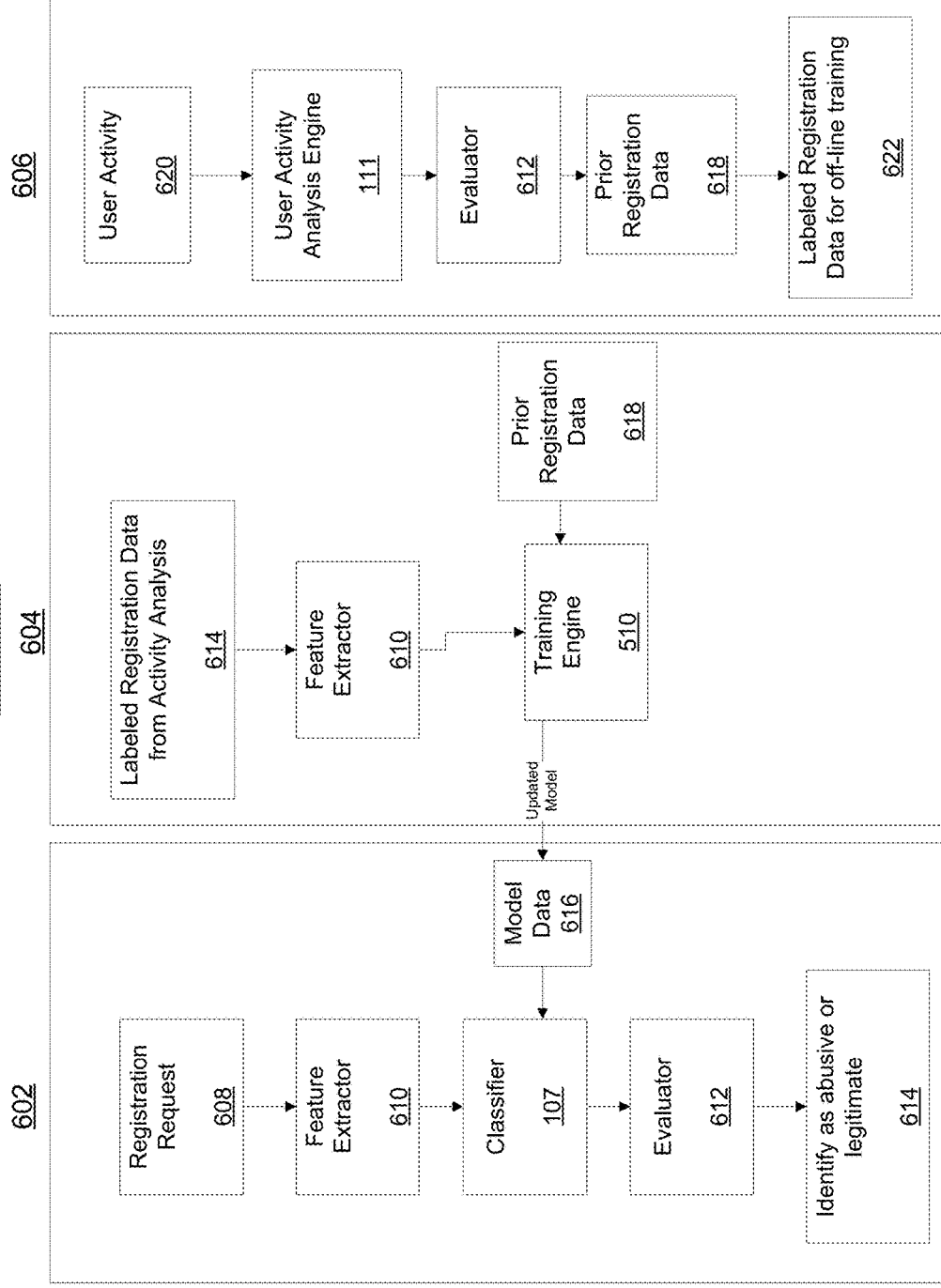

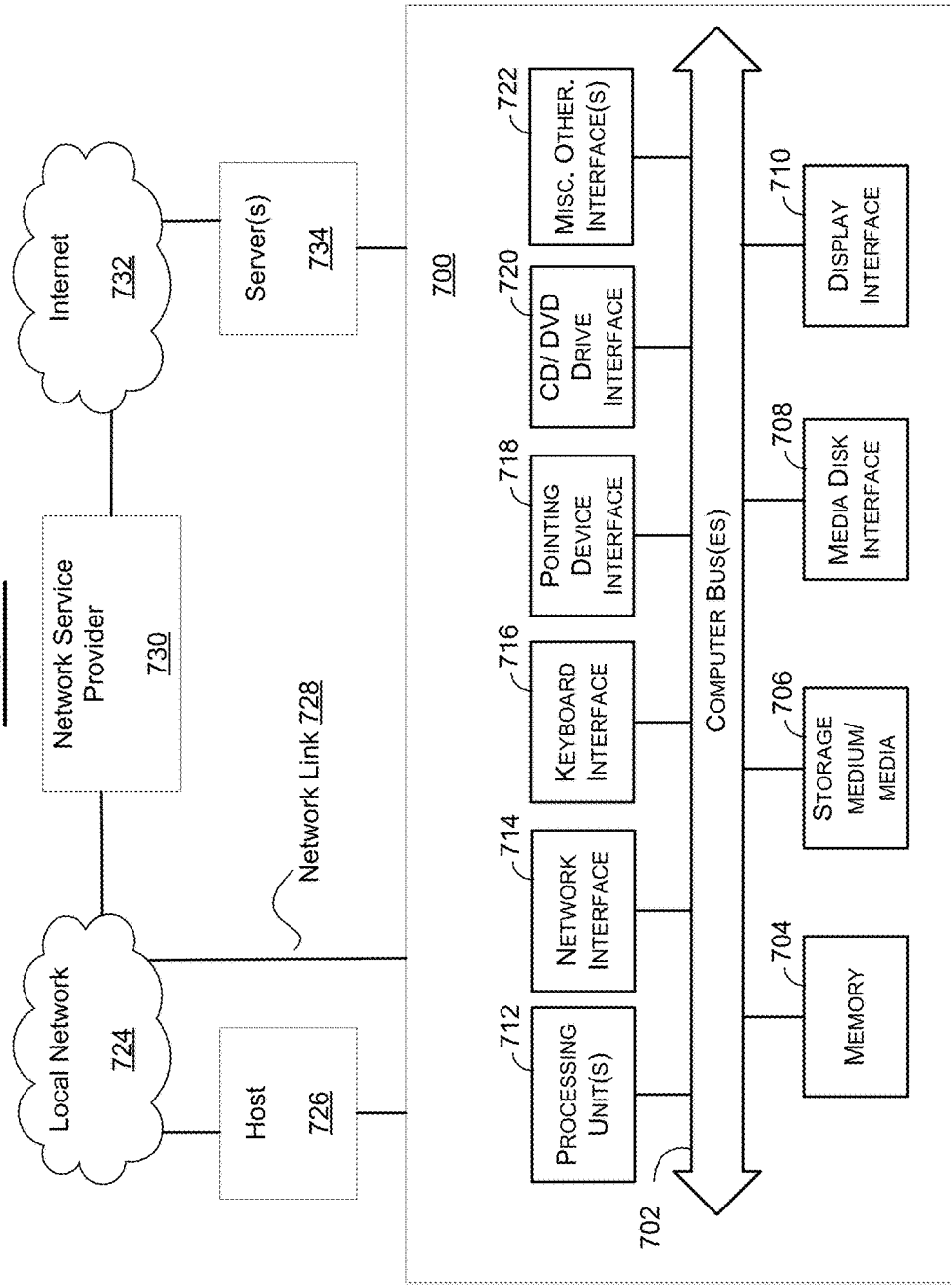

SYSTEM AND METHOD FOR IDENTIFYING ABUSIVE ACCOUNT REGISTRATION

CROSS REFERENCE TO RELATED APPLICATIONS

This application is a continuation of and claims priority from co-pending U.S. patent application Ser. No. 13/564,378, filed Aug. 1, 2012, entitled "SYSTEM AND METHOD FOR IDENTIFYING ABUSIVE ACCOUNT REGISTRATION," which is incorporated herein by reference.

FIELD

The present disclosure relates generally to detecting and acting upon abusive account registration activities, and more particularly, to identifying and acting upon account registration by leveraging collected and learned user information.

RELATED ART

Currently, there are anti-spam systems that are incorporated in and with email systems and other messaging programs. These anti-spam systems analyze the frequency and volume of inbound and outbound messages in order to distinguish spam emails and spammers from valid messages and senders. These systems generally prevent spam by utilizing various known anti-spam techniques which are typically embedded in products, services and software of email systems. However, these techniques are not a complete solution to the ever-present and rising problems associated with spam emails and abusive account activity for they are mostly reactive in nature and take action only after abusive activities have occurred.

SUMMARY

The present disclosure addresses failings in the art by providing a system and method for identifying abusive account registration activities at registration time thereby minimizing the impact of subsequent abusive activity from those accounts. The present disclosure discusses detecting and acting upon registration attempts by abusive users based on leveraging learned patterns in existing rich behavioral data on a network, e.g., within the Yahoo!® network and elsewhere on the Internet as gleaned from data that are publically available, shared on data exchanges or obtained from business partners.

In accordance with one or more embodiments, a method is disclosed which includes collecting, via a computing device, user activity data associated with an existing user account on a network. A pattern is identified within the user activity data, and accordingly, it is determined whether the identified pattern represents legitimate or abusive activity. The method then marks the data provided, derived and saved from that user account's registration as that corresponding to an abusive registration.

A separate and distinct method is also disclosed which uses the marked registration data to train a Classifier to analyze a new account registration. Training the Classifier includes the Classifier being provided with data provided, derived and saved from legitimate and abusive registrations. The Classifier is applied to new account registration request(s) in order to determine whether the new account registration is legitimate or abusive.

In accordance with one or more embodiments, a non-transitory computer-readable storage medium is provided, the computer-readable storage medium tangibly storing thereon, or having tangibly encoded thereon, computer readable instructions that when executed cause at least one processor to detect and mark account registration attempts based on leveraging learned patterns in existing rich behavioral data on a network.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 6 illustrates the subsystems that work together in order to determine an abusive account registration according to some embodiments of the present disclosure; and FIG. 7 is a block diagram illustrating an architecture of a hardware device in accordance with one or more embodiments of the present disclosure.

DESCRIPTION OF EMBODIMENTS

Figure 1:
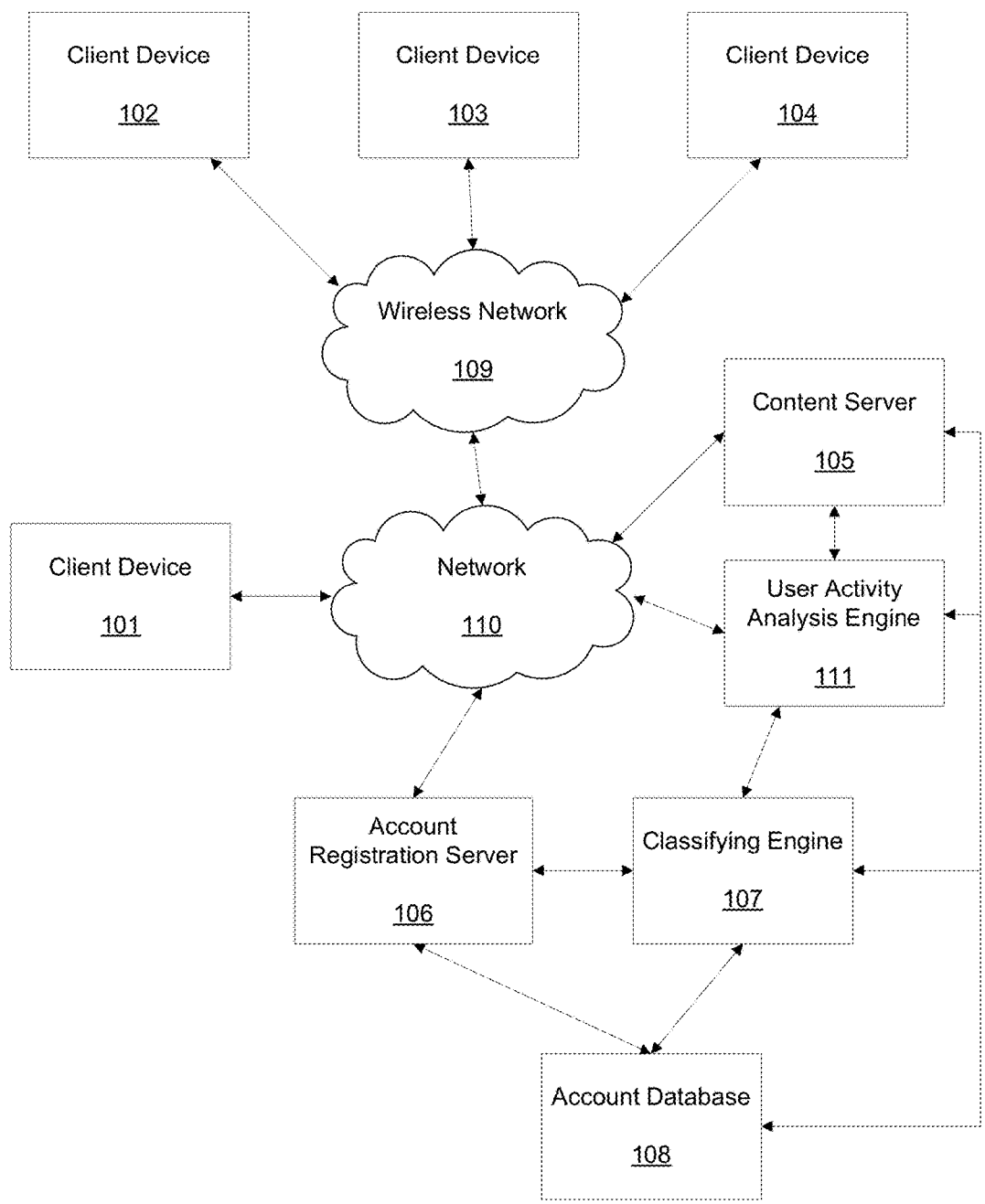
FIG. 1 depicts an example of a system architecture according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

As discussed herein, a "cloud" or "cloud computing environment" is used in an art-recognized manner and can refer to a collection of centrally managed resources such as networked hardware and/or software systems and combinations thereof provided and maintained by an entity, wherein the collection of resources can be accessed by a user via wired or wireless access to a network that may be public or private, such as, for example, a global network such as the Internet. Such centralized management and provisioning of resources can provide for dynamic and on-demand provisioning of computing and/or storage to match the needs of a particular application. The cloud may include a plurality of servers, general or special purpose computers, as well as other hardware such as storage devices. The resources can include data storage services, word processing services, payment remitting services, and many other information technological services that are conventionally associated with personal computers or local and remote servers. Moreover, in one aspect, the resources can be maintained within any number of distributed servers and/or devices as discussed in more detail below.

As discussed herein, an "abusive message" is any message, including but not limited to e-mail, instant messages, text messages, comments, and the like, that is sent (or transmitted/communicated) unsolicited to any destination that accepts content provided by a user (or entity or provider), such as, but not limited to, a large number of other message accounts or to services like message boards, discussion forums, blogs, comment repositories on news sites, and the like in nearly identical form. For example, as understood by those of ordinary skill in the art, a spam detecting system may be implemented within any known network that permits and/or facilitates the sending and delivery of email messages. For some embodiments, the spam detecting system may also be implemented for detecting and filtering text messages, for example SMS or chat messages, or other types of data message, in the same manner described herein for the email embodiments. Spam (E-mail) and Spam (Instant Messaging) are two examples of abusive messages, but not an exhaustive list as other types of abusive messages known or to be known are applicable within the present disclosure. Moreover, for purposes of this disclosure, "abusive" relates to any activity, or pattern of activity, that is related to sending or facilitating sending of "abusive messages", or conducting activity that is outside the intended use of the network or service.

By way of background, accounts on major Internet networks are of significant commercial value. For example, spamming can be economically viable because advertisers that use spam to market products and services have almost no operating costs beyond the management of their mailing lists, and it is difficult to hold senders of spam accountable for their massive message campaigns. Because the worldwide barriers are so low to be a spammer, spammers are numerous, and the volume of unsolicited spam messages has increased every year. The negative costs of spam messages, such as lost productivity by those who view them and fraudulent products and/or services that are sold in this matter, are borne by the public, Internet service providers and/or message account providers. Internet service and account providers are forced to pay for extra processing capacity to cope with the large amount of spam messages. There is also reputation damage that may be caused by spammers. For example, spam filters may blacklist a particular server if it gets a "bad reputation" for the sending of spam messages. This requires time and effort to resolve, usually by several people. There are the direct costs, as well as the indirect costs borne by the victims—both those related to the spamming itself, and to other crimes that usually accompany it, such as financial theft, identity theft, data and intellectual property theft, virus and other malware infection, fraud, and deceptive marketing.

Because spamming contravenes the vast majority of account providers' acceptable-use policies, most spammers make a considerable effort to conceal the abusive use of their message accounts for spam messaging. For example, spam messages are often forwarded through insecure proxy servers belonging to unwitting third parties. Also, spammers frequently use false names, addresses, phone numbers, and other contact information to set up "disposable" message accounts at various providers. Additionally spammers often generate different usernames for each account. In many instances the creation of such accounts is automated to some extent so that large numbers of accounts can be created. In some cases, spammers have used falsified or stolen credit card numbers to pay for these accounts. Typically, spammers quickly move from one message account to the next as each abusive use of a message account is discovered.

The existing techniques for preventing such abusive activity fail to adequately remedy the situation. One existing approach is based on damages that already have occurred. That is, after an account has been created, and the abuse has occurred, an account would then be shut down. Another existing approach is based on the notion of frequency counting. This is performed after the accounts have been created and the costs to service providers, advertisers, account providers and/or users have occurred. Frequency counting is limited to identifying a volume of emails as spam. Such approaches are not tailored to the settings of a particular network. Thus, it could lead to a long latency, inferior accuracy and catch rate, and inability to block abuse prior to the damages having occurred, or costs having been incurred.

The present disclosure remedies the above shortcomings by providing a method and system that thwarts abusive messaging prior to any such occurrence by leveraging usage patterns identified from behavioral data on a network beyond those directly linked to abusive activity. That is, the present disclosure discusses identifying and marking abusive account registration at the time the account is created. Any subsequent activity from an account that was marked abusive at creation receives a very high level of scrutiny. Activity that is suspected to be abusive is challenged or even terminated forcibly prior to completion, with the challenge level graded by the severity of abuse. This prevents spammers from obtaining the ability to send out spam, or engage in other types of abusive activity.

Various monetization techniques, cost transfer strategies or models may be used in connection with electronic communication management and registration, as discussed herein. Electronic mail payment, registration and transmittal costs may be divided between parties including one or more publishers or publisher networks, and one or more marketplace facilitators or providers, potentially among other parties.

Some models may include guaranteed delivery advertising, in which advertisers may pay based at least in part on an agreement guaranteeing or providing some measure of assurance that the advertiser will receive a certain agreed upon amount of suitable advertising, or non-guaranteed delivery advertising, which may include individual serving opportunities or spot market(s), for example. In various models, advertisers may pay based at least in part on any of various metrics associated with advertisement delivery or performance, or associated with measurement or approximation of particular advertiser goal(s). For example, models may include, among other things, payment based at least in part on cost per impression or number of impressions, cost per click or number of clicks, cost per action for some specified action(s), cost per conversion or purchase, or cost based at least in part on some combination of metrics, which may include online or offline metrics, for example.

During presentation of advertisements, a presentation system may collect descriptive content about types of content presented to users or the content being provided by the users on particular sites or via their interaction within a site/domain or network. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

The preferred embodiments of the present disclosure will now be described with reference to FIGS. 1-7. The embodiments of the present disclosure discuss detecting and marking abusive account registration. That is, the present disclosure discusses identifying and marking abusive account registration while such accounts are created by accounting for users' behaviors on a network and the impact to the cost and/or revenue of the network. The present disclosure is proactive as it allows for actions to be taken at the earliest possible time in the registration process before an account can be created. This prevents abusive activity from taking place within the network and effecting privileges assigned to registered users. Additionally, the effects of the present disclosure's marking of abusive account registration minimizes the negative impacts of abusive activity on normal user accounts.

FIG. 1 illustrates an exemplary environment for identifying and marking abusive account registration, in accordance with some embodiments of the present disclosure. Not all of the components may be required to implement the disclosed method and systems, and variations in the arrangement and type of components may be made without departing from the spirit or scope of the present disclosure. As shown, system 100 of FIG. 1 includes client devices 101-104, content server 105, account registration server 106, classifying engine 107, account database 108, and user activity analysis engine 111.

FIG. 1 further depicts wireless network 109 and network 110. The network 110 may couple devices so that communications may be exchanged, such as between a server and a client device or other types of devices, including between wireless devices coupled via a wireless network, for example. A network 110 may also include mass storage, such as network attached storage (NAS), a storage area network (SAN), or other forms of computer or machine readable media, for example. A network 110 may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Although there are various types of networks, wireless networks may be used, e.g., wireless network 109. A wireless network 109 may couple client devices 101-104 with a network 110. A wireless network may employ stand-alone, ad-hoc networks, mesh networks, Wireless LAN (WLAN) networks, cellular networks, or the like.

A wireless network 109 may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a wireless network 109 may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network 109 may include virtually any type of wireless communication mechanism by which signals may be communicated between devices, such as a client device or a computing device, between or within a network, or the like.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

In some embodiments, the disclosed networks 109 and/or 110 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Accordingly, in some embodiments, the present disclosure may be utilized via a content distribution system comprising a peer-to-peer network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

According to some embodiments, the present disclosure may also be utilized within a social network. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like. A social network may include individuals with similar experiences, opinions, education levels or backgrounds. Subgroups may exist or be created according to user profiles of individuals, for example, in which a subgroup member may belong to multiple subgroups. An individual may also have multiple associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so-called 'virtual persons.' An individual's social network may be represented in a variety of forms, such as visually, electronically or functionally. For example, a "social graph" or "socio-gram" may represent an entity in a social network as a node and a relationship as an edge or a link.

In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, SMS/MMS, email, instant messenger clients, forums, social networking sites, or the like.

Client devices 101-104 include computing devices capable of sending or receiving signals, such as via a wired or a wireless network, e.g., network 110 and wireless network 109. Client devices 101-104 include, for example, a desktop computer or a portable device, such as a cellular telephone, a smart phone, a display pager, a radio frequency (RF) device, an infrared (IR) device, a web enabled Personal Digital Assistant (PDA), a handheld computer, a tablet computer, a laptop computer, a multiprocessor system, microprocessor-based or programmable consumer electronics, network PCs, a set top box, a wearable computer, a game console, smart TV, an integrated device combining various features, such as features of the forgoing devices, or the like. The client device (or user device) includes a processor and memory for storing and executing data and software. Computing devices may be provided with operating systems that allow the execution of software applications in order to manipulate data. A client device can be connected to the network, such as the Internet, via a wired data connection or wireless connection such as a Wi-Fi network, a satellite network or a cellular telephone network. A client device can support any type of interface for enabling the presentation or exchange of data. In addition, a user device may facilitate various input means for, but not limited to, receiving and generating information, including touch screen capability, keyboard and keypad data entry and voice-based input mechanisms. Any known and future implementations of user devices are applicable.

The client devices 101-104 may vary in terms of capabilities or features. Subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

The client devices 101-104 may include or may execute a variety of operating systems, including a personal computer operating system, or a mobile operating system. A client device may include or may execute a variety of possible applications, such as a client software application enabling communication with other devices, such as communicating one or more messages, such as via email, IMs, short message service (SMS), or multimedia message service (MMS), including via a network. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games. The foregoing is provided to illustrate that the disclosed subject matter is intended to include a wide range of possible features or capabilities.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a "server" should be understood to refer to a service point that provides processing, database, and communication facilities. By way of example, and not limitation, the term "server" can refer to a single, physical processor with associated communications and data storage and database facilities individually or in combination, or it can refer to a networked or clustered complex of processors and associated network and storage devices, as well as operating software and one or more database systems and application software that support the services provided by the server.

In conjunction with the depiction illustrated in FIG. 1, and discussed herein, servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content server 105 may include a device that includes a configuration to provide resources, such as content or services, via a network to another device. As such, content server 105 represents an embodiment of a content system. For example, content server 105 may provide access to any of a variety of content, including, but not limited to messages, such as emails, SMS messages, IM messages; search results; news; articles; websites; hyperlinks; ads; reviews; as well as content that may include audio files, video files, text files, streaming files, graphical files, or the like. Thus, virtually any content may be available through content server 105 for access by client devices 101-104. In an embodiment, a content server 105 may, for example, host a web site, such as a social networking site platform, or a personal user site (such as a blog, vlog, online dating site, etc). A content server 105 may also host a variety of other sites, including, but not limited to business sites, educational sites, dictionary sites, encyclopedia sites, wikis, financial sites, government sites, and the like. A content server 105 may further provide a variety of services that include, but are not limited to, web services, third-party services, audio services, video services, email services, instant messaging (IM) services, SMS services, MMS services, FTP services, voice over IP (VoIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc. However, content server 105 is not limited to these mechanisms, and/or content or services, and others are envisaged as well.

Content server 105 may also be enabled to request information from a user(s) of client devices 101-104. For example, content server 105 may provide creation/registration and/or access to an account, which may request user login information. Such login information may include a user name, password, or other identifier of the user and/or client device used by the user. Moreover, content server 105 may also be configured to manage information for a user, such as an address book, buddy list, or other type of contact list. Such contact lists may be made available to the account registration server 106, classifying engine 107 and/or account database 108, according to one or more embodiments. In some embodiments, the Content Server 105 can be embodied as an "Activity Server" that stores and analyzes data on user activity within the network, as discussed herein. For example, the Content Server 105 acting within an activity server capacity, can receive, pull, scrape, process and analyze (in addition to any other type of processing methodologies) user activity data in accordance with the information the user activity analysis engine 111.

The functionality and implementation of the account registration server 106, classifying engine 107, user activity analysis engine 111 and account database 108 is described in more detail below in conjunction with FIG. 2-6. Generally, abusive account identification includes learning the features of abusive and legitimate (or normal) account registrations by collecting and recording registration information and user activity on a continuous basis. This can be referred to as "training the Classifier" implemented through the classifying engine 107, as discuss below. That is, contemporaneously, incoming data for new account registrations are examined and evaluated to determine whether the new account is a normal or abusive account. As such, features of new account requests are compared against features of the collected and recorded information, and each new account request is classified and labeled based upon a determination indicating whether the new account request is for a legitimate (or normal) or abusive purpose.

According to some embodiments, the account registration server 106 is configured to receive new account registration information from a user, including, but not limited to, a proposed username, contact information, browser application, network IP address, and the like. Features of the received account registration information can be compared against features of the information stored within the account database 108. The account database 108 can collect information provided during registration for the account responsible for a given activity on the network. This information can be collected by the user activity analysis engine 111 (and/or content server 105), and provided to the account registration server 106 and/or the classifying engine 107. For example, user activities on a network can be closely tracked by user activity analysis engine 111 and recorded in the account database 108. The user activity, which can be monitored and analyzed by user activity analysis engine 111, can include familiar usage patterns of normal, revenue generating users, in addition to those activities and behaviors by abusive users. Such usage information can be aggregated or associated with individual or particular accounts. Also, such usage information can include characteristics or behavioral patterns to form a corpus of training information. Based on the information accumulated by user activity analysis engine 111, which is recorded and stored in the account database 108, the classifying engine 107 performs one or more processes to determine the likelihood of whether the new account is to be used for abusive purposes. Such determination is based upon user activity data collected from users' activities on networks 109 and 110.

Figure 5:
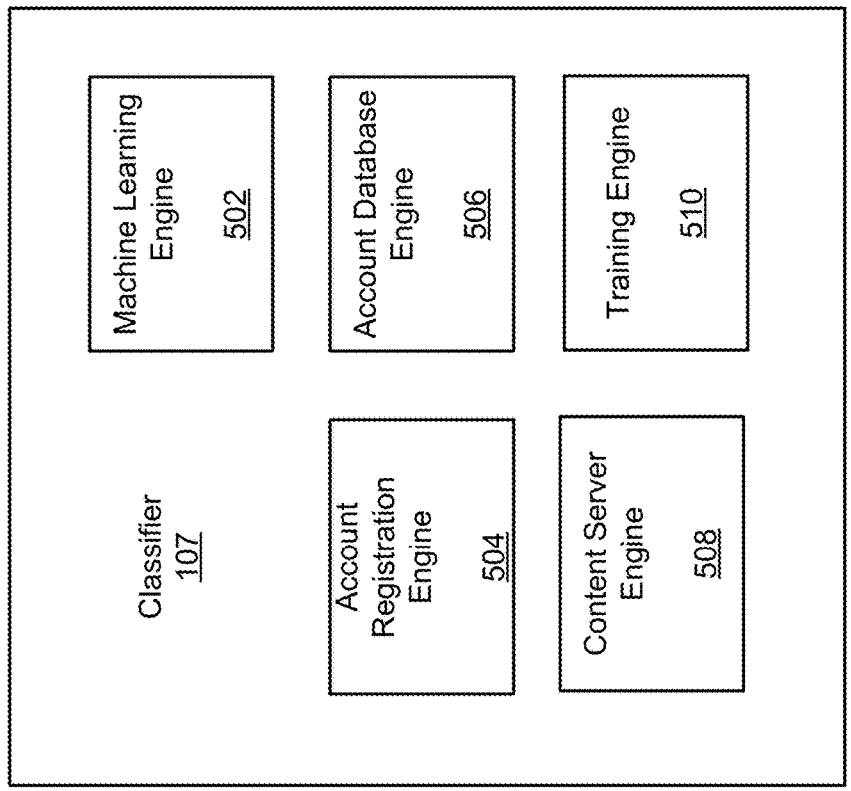
FIG. 5 illustrates a Classifier engine adapted to detect abusive account registration according to some embodiments of the present disclosure.

As discussed in more detail below, "training the Classifier" corresponds to functionality related to the classifying engine 107 (or a machine learning "Classifier"). FIG. 5 illustrates some of the elements in the Classifier 107 which is configured to identify and mark abusive account registration, as discussed herein. The Classifier 107 includes a machine learning engine 502, an account registration engine 504, an account database engine 506, a content server engine 508 and a training engine 510. An "engine" as referred to herein is meant to describe a software, hardware or firmware (or combinations thereof) system, process or functionality that performs or facilitates the processes, features and/or functions described herein (with or without human interaction or augmentation). As will be apparent from the discussion herein, the account registration engine 504 is configured to communicate with and receive information from the account registration server 106, the account database engine is configured to communicate with and receive information from the account database 108, and the content server engine 508 is configured to communicate with and receive information from the content server 105.

As discussed in more detail below, in relation to FIG. 6, the Classifier 107 is configured to classify new registration requests (see subsystem 602). The training engine 510 is configured to train the implemented machine learning model(s) implemented by the Classifier 107 (as discussed in relation to FIG. 6, subsystem 604). Additionally, the Classifier 107, in connection with analysis performed by the training engine 510, is configured to analyze on-line activity with regard to designations of legitimate or abusive activity (as discussed in relation to FIG. 6, subsystem 606). In some embodiments, it should be understood that the engines implemented by the Classifier 107, can be separate engines that are in communication with, coupled to, or associated with the Classifier 107 or other existing components discussed herein, e.g., the components discussed in FIG. 1. For example, training engine 510 can be an externally implemented engine, such as a device or server, that is associated with and/or communicates directly with the Classifier 107 and user activity analysis engine 111, in addition to other components.

In some embodiments, the Classifier 107, and engines 502-510 are binary classifiers (or engines). That is, the Classifier 107 determines only if the given request is abusive or not. In some embodiments, additional classifiers can be utilized that, for example, determine if the request is legitimate or not. Therefore, in order to make a final determination regarding legitimacy or abusiveness of a request, the Classifier 107 may, in some embodiments, use a "results aggregator" that reviews the individual results from each classifier, and based on a score provided or confidence level associated with each, weights one or the other appropriately.

It should be understood that the Classifier 107 can be implemented via the account registration server 106, the content server 105, an additional computing device coupled to a single or a combination of existing servers, or any functional arrangement of hardware devices on a network. That is, the Classifier 107 can be deployed as a standalone device, or in association with any device contemplated with respect to the illustration of FIG. 1. Additionally, although the Classifier 107 is depicted to be in communication with the other elements of FIG. 1, it is contemplated that other devices or equipment (e.g., network elements, servers, devices, processors) can deploy the hardware and components of the Classifier 107.

The Classifier 107 can employ artificial intelligence (AI) and/or machine learning and reasoning (MLR) when making determinations regarding new account registration requests based upon the information stored in the account database 108. In some embodiments, the Classifier 107 is configured to receive information related to new account registration requests and/or account database information, in addition to service protocols and implementations of such from the content server 105 (e.g., service provider). Such techniques may be provided to employ a probabilistic and/or statistical-based analysis to prognose or infer an action that a user desires to be automatically performed. For example, AI and MLR mechanisms can be employed to infer the accuracy or validity of a user's identity, characteristics and/or past, present or future behavioral patterns based upon most any number of context and/or other factors, such as, but not limited to message traffic, heuristic values, statistical values, and/or other values associated with a user and/or his account. According to some exemplary embodiments, the Classifier 107 can be trained incrementally while performing identification of abusive accounts.

In some embodiments, the Classifier 107 can utilize heuristics, statistics, clustering of information, logical decision trees, among other known or to be known processes/analysis techniques for making determinations regarding new account registrations. That is, based on existing accounts, and their activity, determinations can be made as to whether a new account registration is for an abusive purpose. For example, logical decision tree processes may be performed on information recorded and stored in the account database 108. Based on the logical tree classification of an account registration and/or message traffic as abusive, account registrations, or previously registered accounts may be adjusted/updated accordingly in the account database 108. In another example, heuristic analysis and/or statistical analysis may be performed on previously registered account registrations. Based on the heuristic and/or statistical classification of an account registration and/or message traffic as abusive, the information associated with such accounts and/or traffic may be adjusted/updated accordingly in the account database 108.

In another embodiments, clustering analysis may be performed by the Classifier 107 on the features of previously registered accounts. This implementation of the Classifier 107 may be performed offline by a clustering engine that is implemented by the Classifier 107. For example, if similar characteristics are identified for a cluster of account registrations and/or their message traffic, the information associated with such accounts may be adjusted/updated accordingly in the account database 108. In some embodiments, the information can be adjusted/updated either automatically and/or manually to reduce false positives, i.e., account registrations that are incorrectly identified as abusive. Thus, as discussed in more detail below, after such accounts have been updated to reflect their abusive or legitimate (normal) nature regarding the accounts' usage, incoming account registration requests can be identified as abusive or legitimate based at least in part on a comparison between features of the account request information and predetermined account information existing in the account database 108.

As discussed in more detail below, the Classifier 107 can employ the analysis discussed above, including but not limited to, heuristics, statistics, clustering of information, logical decision trees, AI, MLR, and the like, either singly, or in any combination, to identify and determine an account registration's status, as discussed herein.

Embodiments can exist where the account database 108 is associated with the account registration server 106, classifying engine 107 and/or the content server 105. In some embodiments, the account database 108 may be situated remotely, whereby the account registration server 106, classifying engine 107 and/or the content server 105 can retrieve the stored abusive account information over networks 109 and/or 110. In some embodiments, devices 105, 106 and/or 107 may be implemented within a single network device or mobile device, or distributed across a plurality of network devices.

Figure 2:
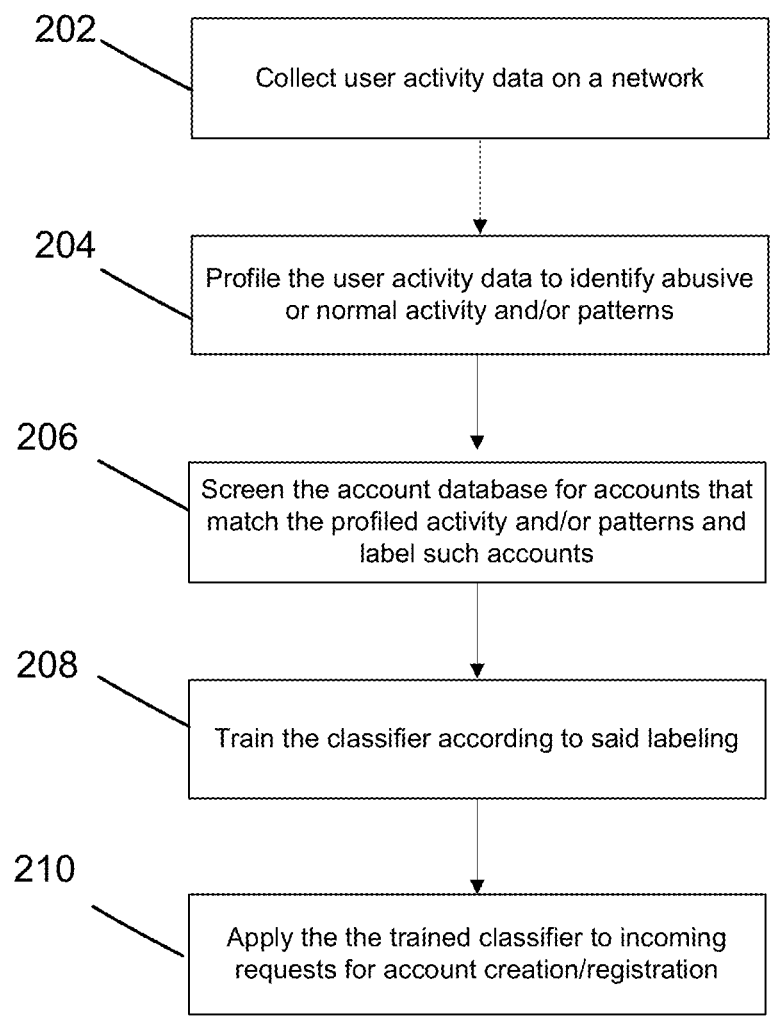
FIG. 2 depicts a block diagram illustrating steps for training the disclosed system to identify abusive account registration according to some embodiments of the present disclosure.

FIG. 2 illustrates the steps for training the classifying engine 107 (or Classifier) in order to identify abusive account registration. In Step 202, user activity data on a network is collected. That is, as discussed above, users' activity for users having existing accounts are tracked and stored in the account database 108. In Step 204, the user activity data for each user's account is profiled to identify abusive or normal activity and/or patterns. That is, activity associated with existing accounts are profiled, or analyzed, to determine whether each account is performing or engaged in abusive or normal activity. In some embodiments, profiling involves identifying relevant patterns in the collected user activity data. That is, important data keys within the activity data and their values are isolated, and any significant combinations of such data are identified. The identified combinations contribute to the determination or identification of abusive or legitimate activity. The identified combinations can signal the reputation of the account owner as either abusive or normal (or legitimate). For example, if a user's activity includes sending a large number of emails to a vast array of recipients not within the user's contact list during a short time period, e.g., less than 1 minute, such activity may be identified as "abusive", in that spamming may be occurring.

In some embodiments, the user activity data collected in Step 202 and profiled in Step 204 can include, or be based upon contributing factors associated with the account registration request and/or existing accounts, such as similarity of the registration information to the registration information of other previously registered users that created accounts engaging in abusive/legitimate activity. For example, such contributing factors can include, but are not limited to, the overall length of the username, the amount of transitions in the username, the amount of numbers in the username, the amount of letters in the username, the amount of symbols in the username, amount of previous inbound messages from a message account within a time period, amount of previous inbound messages with similar content from other message accounts, amount of recipients of inbound messages sent by a message account, and the like. Also, the particular domain of origination associated with an account may be more probable to be associated with an abusive message account than other domains.

According to some embodiments of the present disclosure, user activity data stored in the account database 108 can be classified into separate categories. One category is user behavior data. User behavior data contains user preference and activity information. This information can be utilized to individualize or customize services provided to a user. Usage patterns identifiable from the activity information are reliable indicators of legitimate (or normal) activities. Each user's account is identifiable by a unique ID string. Thus, the user's behavior data, and therefore their preference and activity information, are associated with the user's unique ID string. Therefore, upon determining a user's activity, a user's account and the activity of such user can be identified via his/her respective ID string. As such, a user's account, activity information, and/or ID can be utilized as a training signal for the Classifier 107.

Another category of user data is abusive user data. Abusive user data includes account information for users whose accounts have been disabled and/or put on probation due to their observed abusive activity. For example, abusive activity can include spamming or other actions that violate a service agreement. These accounts and the information associated with such accounts are identifiable via their ID, and can serve as a training signal for the Classifier 107. That is, upon identifying an account creation request for a new user that corresponds, matches or triggers similarities with abusive user data, the new account request can be identified as having an abusive purpose, as discussed in more detail below.

Another category of user data is historical account registration data. Historical account registration data includes information collected during registration for existing accounts. This information can include content that is required for account creation, in addition to content that is submitted voluntarily, such as name, date of birth and gender, to name a few pieces of content/information. Also, historical account registration data can include information collected by the system, or service provider, at the time of registration, such as, time, date, browser's IP address and request headers, in addition to other data and metadata that can be automatically collected. According to some embodiments, user data stored in the account database 108 can also include data that is not associated with an existing account. For example, such information can include information collected and/or processed during unsuccessful account registrations.

It should be understood that the user activity data, including but not limited to user behavior data, abusive user data and historical account registration data, collected and stored in the account database 108 can be monitored and adjusted accordingly via heuristics, statistics, clustering of information, logical decision trees, AI, MLR, and the like. As such, based on the activity associated with each account, an account can be identified as abusive or legitimate.

In Step 206, based on said profiling from Step 204, the account database 108 is screened to identify accounts that match the profiled activity. Accounts having associated user activity data matching data profiled as abusive activity are labeled (or identified) as abusive accounts. Accounts having associated user activity data matching data profiled as normal activity are labeled as normal accounts. In some embodiments, only recently created accounts are screened and labeled, such as within the last day, hour, or other predetermined time period. In some embodiments, the labeling of accounts involves associating an account's ID with an abusive or normal indicator, where such information is updated and stored in the account database 108. In some embodiments, the user behavior data and/or historical account registration data for the labeled accounts is fetched and also identified according to how the associated account is labeled. This information can be fetched from the account database 108, account registration server 106 or content server 105.

In Step 208, the Classifier 107 is trained according to the labeled accounts and/or labeled user activity data. That is, the Classifier 107 is taught to recognize and identify abusive activity and account registrations respective of the labeled accounts and/or labeled user activity data. In some embodiments, the Classifier 107 can employ artificial intelligence (AI) and/or machine learning and reasoning (MLR) to optimize the information derived from the labeling in Step 206. In some embodiments, training the Classifier 107 can also involve feature extraction. That is, raw data collected from the labeled accounts and user activity data is converted into a multi-dimensional feature vector of elements of numerical data. From the raw data, relevant information related to abusive and/or legitimate account activity can be extracted and utilized by the Classifier 107 to identify abusive or legitimate accounts. Therefore, the Classifier 107 can optimize the feature vector(s) derived from the labeled information. Such optimization occurs for ascertaining account status for at least two labeled groups: "legitimate" (or "normal") and "abusive" information. Additionally, it should be understood that the Classifier 107 can employ any data analysis software package or mathematical algorithm for feature extraction. Similar numerical programming environments can be implemented by the Classifier 107, such as those available via scripts or third-party add-ons.

In Step 210, the Classifier 107 evaluates (or is applied to) incoming registration requests regarding the creation of new accounts. The Classifier 107 examines incoming data for new account registrations to determine whether the new account is for a legitimate or abusive purpose. That is, features of new account requests are compared against features of the labeled information. Each new account request is classified and labeled based upon a determination indicating whether the new account request is for a legitimate or abusive purpose. In exemplary embodiments, Steps 206-210 are repeated. In some embodiments, the repetition occurs incrementally, continuously (substantially real-time) or periodically, which can account for user, system or service provider preferences. Thus, the Classifier 107 can be implemented with feeds of labeled information (or known information) and unlabeled information (or new information that has yet to be analyzed or utilized to train the Classifier 107 as discussed herein). That is, the Classifier 107 examines new account requests while contemporaneously being trained. This enables the Classifier to be up-to-date with the most relevant account registration information and account activity information related to legitimate and abusive activity.

Figure 3:
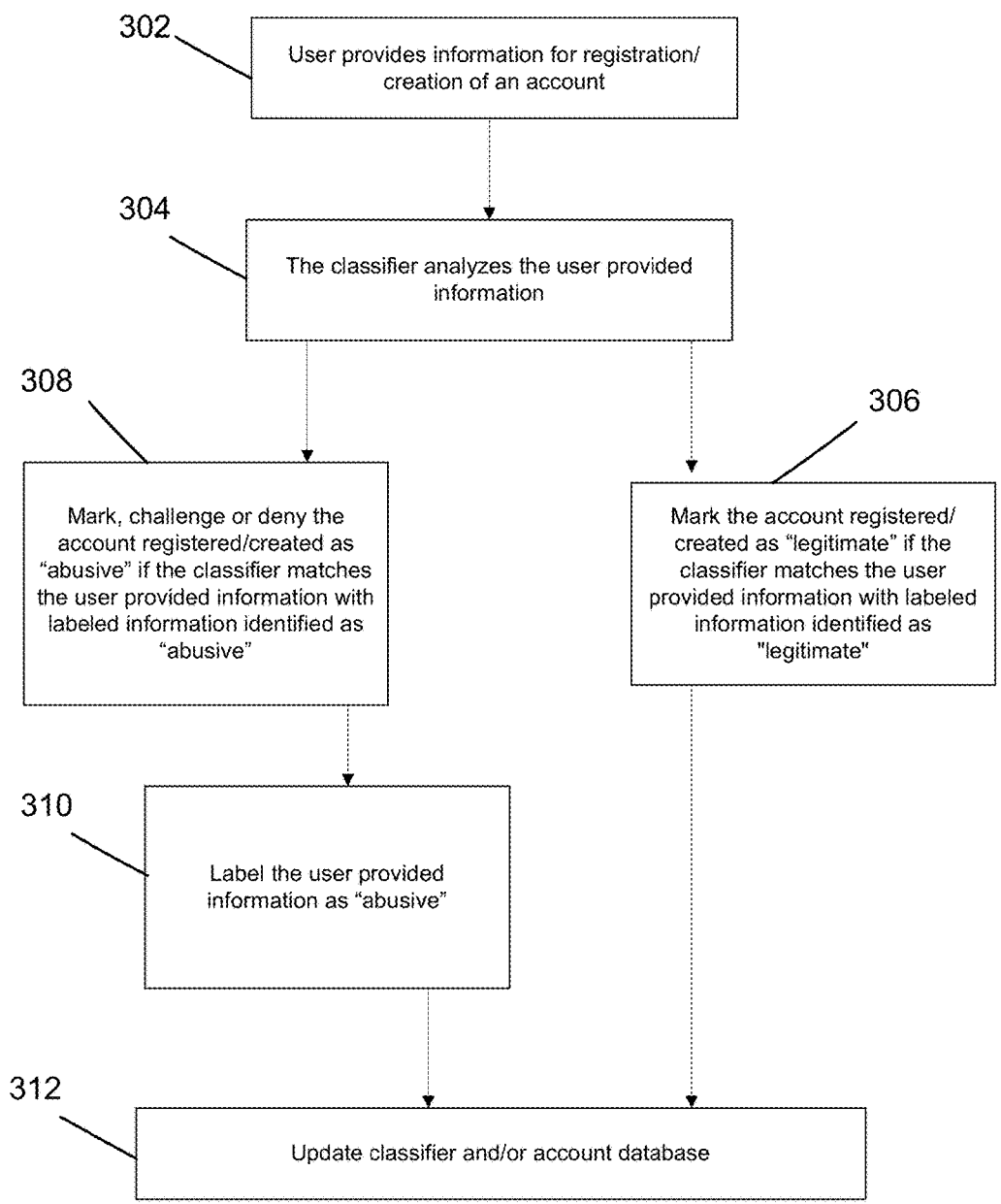
FIG. 3 is a logical flow diagram illustrating one process for determining an abusive account registration is abusive according to some embodiments of the present disclosure.

FIG. 3 illustrates a logical flow diagram generally showing one embodiment of a process for determining an abusive account registration. In Step 302, a user provides information to register or create an account from an account provider. The registration information often includes, but is not limited to, biographical information such as the user's name, address, date of birth, gender, affiliation, referral, and the like. Typically, the user is prompted to select a unique username and a password. In one or more embodiments, a temporary username and password is initially provided to the user, who is prompted to subsequently change the temporary username and/or password within a period of time.

In Step 304, the user provided information is routed to the Classifier 107, where the Classifier 107 determines whether the account creation request is for an abusive purpose. Such determination may also take into account contributing factors discussed above. Thus, if the Classifier matches features of the user provided information with features of the labeled information identified as "legitimate", the account registration is marked legitimate. Step 306. If the Classifier 107 matches features of the user provided information with features of the labeled information identified as "abusive", then the registration is marked abusive. Step 308. In some embodiments, the registration can be challenged by the system, whereby additional information is requested to complete the registration. For example, challenges may be simple like a CAPTCHA (which is a type of challenge-response test used as an attempt to ensure that the response is generated by a person), or complex and out-of-band like a telephone call or SMS with a code that the user must enter back into the registration form. Alternatively, in some embodiments, the registration may be denied. This may arise when the registration request is a blatant attempt to register an abusive account, which is based upon registration information provided matching existing abusive accounts, or accounts that previously (or in some instances, recently) have been blocked (or de-registered). If the account registration is classified as abusive, then the process may deactivate, challenge, deny, require more information and/or analysis, or suspend activities in regard to the account registration. In Step 310, the user provided information that was determined to be abusive is also labeled as "abusive".

Therefore, in Step 312, the Classifier 107 is updated with the information derived from its determination in Steps 304-310. That is, as discussed above, in addition to the discussion in FIG. 2, the Classifier 107 is contemporaneously trained while it analyzes new account registrations. In some embodiments, the account database 108 can also be updated with such information. Additionally, feedback from a successful or unsuccessful account registration can be utilized by the Classifier 107 to continuously reevaluate and re-label previously granted message account registrations.

In some embodiments, the process flow set forth in FIG. 3 may be repeated more than once for previously granted message account registrations. More specifically, in addition to the process flow of FIG. 3 occurring at the time of registration of a new message account, the process flow may substantially occur again after the initial registration is granted and once additional message registrations have been classified as legitimate or abusive. Also, further information may be collected about the account registration, such as the number of messages sent, the content of the inbound or outbound messages, other accounts that were registered with similar contact information and the like.

Figure 4:
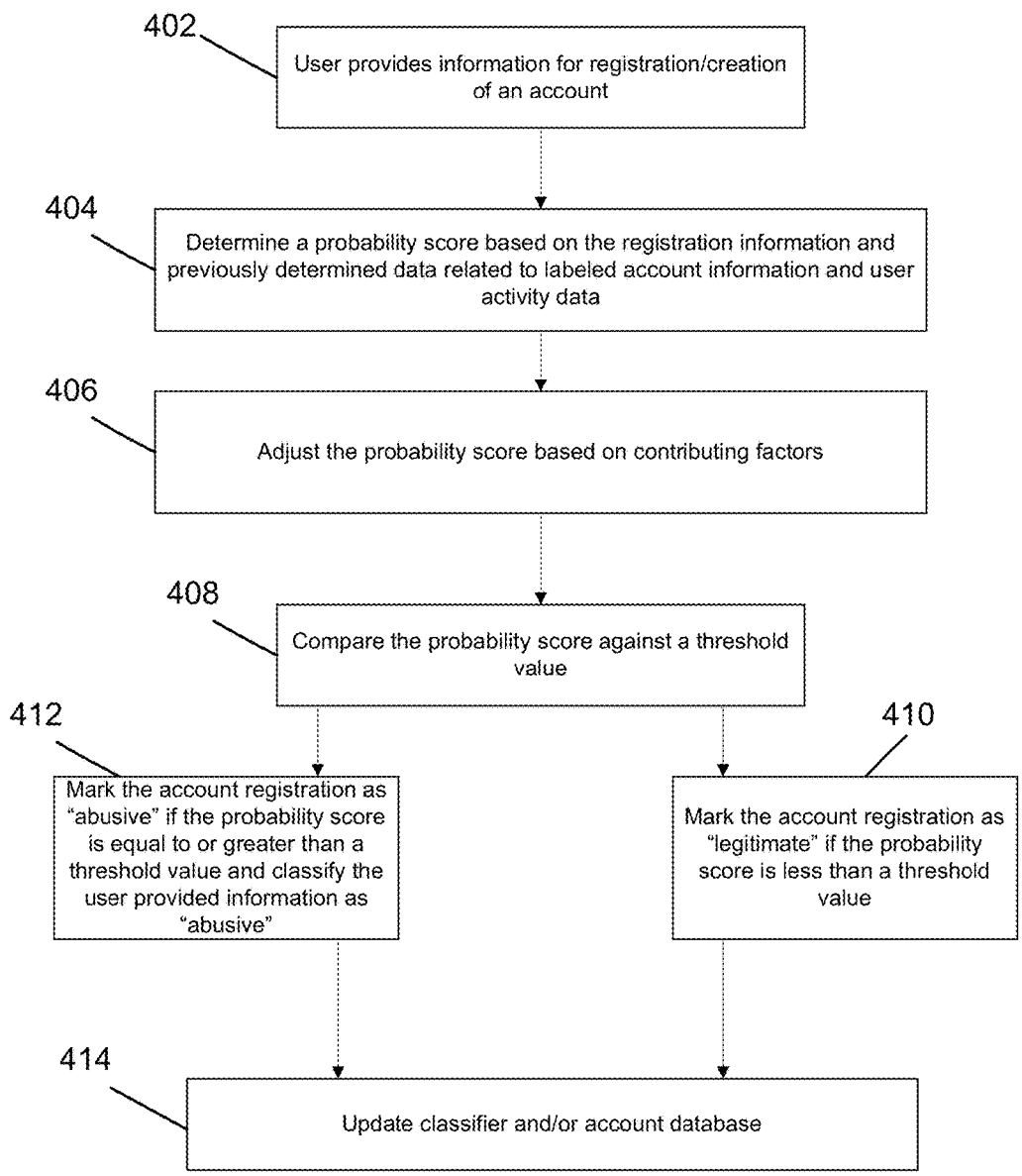
FIG. 4 is logical flow diagram illustrating another process for determining an abusive account registration is abusive according to some embodiments of the present disclosure.

According to some embodiments, abusive account registration determinations can include additional analysis related to probability determinations, as discussed in FIG. 4. FIG. 4 illustrates a logical flow diagram generally showing an embodiment of a process for determining a probability that an account registration is for an abusive purpose. That is, in addition to the Classifier 107 applying learned user activity data to incoming account creation requests (as discussed above in FIG. 3), the Classifier 107 can also (in addition to or alternatively) perform probability determinations based upon the learned user activity data to determine whether an account is for an abusive purpose. In Step 402, a user provides information to obtain a registration for a message account from an account provider. As discussed above, the registration information often includes, but is not limited to, biographical information such as the user's name, address, date of birth, gender, affiliation, referral, and the like. Typically, the user is prompted to select a unique username and a password. In one or more embodiments, a temporary username and password is initially provided to the user, who is prompted to subsequently change the temporary username and/or password within a period of time.

In Step 404, a probability score is determined based on the received registration information and previously determined data. As discussed above, the previously determined data corresponds to labeled account information and user activity data. In some embodiments, a probability score is tabulated according to similarities with the previously determined data, and in other embodiments the probability score may be weighted, or some combination of tabulation and weighting.

In Step 406, the probability score may be adjusted based on contributing factors associated with the account registration request and/or existing accounts, such as similarity of the registration information to the registration information of other previously registered users that created accounts engaging in abusive/legitimate activity. For example, such contributing factors can include, but are not limited to, the overall length of the username, the amount of transitions in the username, the amount of numbers in the username, the amount of letters in the username, the amount of symbols in the username, amount of previous inbound messages from a message account within a time period, amount of previous inbound messages with similar content from other message accounts, amount of recipients of inbound messages sent by a message account, and the like. Also, the particular domain of origination associated with an account may be more probable to be associated with an abusive account than other domains. Further, heuristical values, statistical values, and the like, are also considered in the determination of the probability score for the abusive use of the message account. It should be understood that such factors can be considered either singly or in any combination with any assortment of factors. Additionally, it should be understood that the contributing factors can be utilized in determining the probability score discussed in Step 404.

In Step 408, the probability score is compared against a threshold value. If the probability score is less than the threshold value, then the process moves to Step 410 where the message account registration is marked legitimate. Alternatively, if the determination at decision Step 408 is equal to or greater than the threshold value, the process classifies the account registration as "abusive". Step 412. By way of a non-limiting example, if the probability score is greater than or equal to the threshold value, than the account registration would be classified as abusive and marked as such. In some embodiments, the process may deactivate, deny, require more information and/or analysis, or suspend the account registration. Also, in one or more embodiments, the threshold value may be adjusted either automatically and/or manually by the system, Classifier 107, or service provider, to reduce false positives, i.e., account registrations that are incorrectly identified as abusive or legitimate.

Once the process has moved to either Step 412 or Step 410, it subsequently moves to Step 414 where the Classifier 107 is updated with the information derived from its determination in Steps 404-412. That is, as discussed above, the Classifier 107 is contemporaneously trained while it analyzes new account registrations. In some embodiments, the account database 108 can also be updated with such information. Additionally, feedback from a successful or unsuccessful account registration can be utilized by the Classifier 107 to continuously reevaluate and re-label previously granted message account registrations.

In some embodiments, if the score from classification is within a range (preset by the system, network or content provider) to the threshold, an action then is to present an appropriate challenge to the user. Legitimate users typically complete the challenge, whereas abusive users abandon their registration. For example, challenges may be simple like a CAPTCHA, or complex and out-of-band like a telephone call or SMS with a code that the user must enter back into the registration form. Additionally, as discussed above, it should be understood that challenges may also be utilized when the matches between labeled information and incoming request information are not a clear match (e.g., the discussion related to FIGS. 3 and 6).

According to some embodiments, the Classifier 107 can employ the steps from FIG. 3 and FIG. 4, in whole or in part, at the same time, or in connection with each other. Such utilization of implementations of the Classifier 107 can function to reduce false positives, i.e., message account registrations that are incorrectly identified as abusive or legitimate.

By way of a non-limiting example, the Classifier 107 can identify an account registration request based on analysis of the user provided information from the account request. There are a number of characteristics that are indicative of a higher probability that a message account is registered for abusive purposes, as discussed above in relation to the contributing factors which may be such things as the similarity of the registration information to the registration information of other previously registered users that opened abusive message accounts. A high degree of similarity to multiple other user registration information may indicate a high degree of probability that the current registration is intended for abusive purposes, such as spam. This comparison may include, among other features, a temporal component, such as having 100 "John Smith" registrations applied for with ten minutes of each other. Other information may be compared such as the similarity of names, geographical locations, IP addresses, and the like. Also, other comparisons may include a high velocity of outbound and/or inbound messages, a high number of message recipients, consistently short or long messages, content of messages and other types of patterns or characteristics that can distinguish non-abusive use from abusive use of an account registration.

FIG. 6 illustrates the separate subsystems (or activities) that work together to identify abusive account registrations, as discussed above. FIG. 6 illustrates some embodiments of subsystems or activities detailed in the present disclosure utilized to identify abusive account registration(s). The subsystems include on-line classification of new registration requests 602, off-line training of a machine learning model(s) 604 for the Classifier 107, and on-line activity analysis for abusive activity 606. As discussed above, the Classifier 107 is configured to classify new registration requests (subsystem 602). The Classifier 107, through the implementation of training engine 510, is configured to train the implemented machine learning model(s) implemented by the Classifier 107 (subsystem 604). Additionally, the Classifier 107, in connection with analysis performed by the training engine 510, is configured to analyze on-line activity with regard to designations of legitimate or abusive activity (subsystem 606).

Subsystem 606 continually analyzes user activity 620 to determine if it is abusive. It should be understood that in practice that are many such subsystems that can perform the steps illustrated in 606, however they are very similar in the objective, and only specific implementations may differ. After user activity 620 is analyzed by the user activity analysis engine 111, an evaluator 612 implemented by the Classifier 107 identifies whether such activity 620 is abusive or legitimate. Thus, when the activity 620 is determined to be abusive, the Classifier 107 can take steps to mitigate the abusive activity's impact. That is, users associated with such activity can be penalized, challenged or denied access to their accounts either permanently, whereby the account is disabled, or for a predetermined period of time or attempts. Additionally, the users associated with abusive activity, and their prior registration data 618, can be marked for use in training. This information can then be utilized and/or fed to the training subsystem 604.

The training subsystem 604 analyzes labeled registration information 614, which can be directly provided by the user (e.g., first name, last name, zip code, and the like), as well as indirectly available information (e.g., IP address, time-of-day, geo-location, prior registrations from the same location, and the like). Within subsystem 604, a feature extractor 610 builds a map of the characteristics of the available information, both direct and derived, as discussed above with respect to FIG. 2, step 208. A feature map is constructed in a way that is easy for the Classifier 107 to apply AI/MLR (e.g., applied analysis algorithms) to process quickly and efficiently, as discussed above. That is, using the labeling information 614 (that indicates a given user account as abusive or legitimate), the training subsystem 604 builds a model 616. The model 616 is data that is organized in a form that is quick and efficient for the Classifier 107 to analyze and utilize in making abusive registration determinations. In some exemplary embodiments, the training subsystem 606 is off-line and works in batch mode. Additionally, the information derived from the feature extractor 610, e.g., model data 616, can be supplied the training engine 510 for use in future determinations (and in some embodiments in conjunction with prior registration data 618).

The classification subsystem 602 is implemented on-line and works in synchronous mode. As illustrated in FIG. 6, as a new registration request 608 is received, features are extracted from the available information by the feature extractor 610. The features are extracted in a similar manner as discussed above. Indeed, extracted features can be derived directly from provided information, as well as indirectly, as discussed above. The Classifier 107 compares the extracted features against features of known abusive registrations available from the model 616 provided by the training subsystem 604. In some exemplary embodiments, evaluator 612 (which is an embodiment of the Classifier 107) then derives a score that is compared against the threshold to determine if the request is abusive, as discussed above in relation to FIG. 4. Thus, the registration request can be identified and marked as legitimate or abusive 614.

As discussed herein, the present disclosure discusses identifying and marking abusive account registration at the time the account is created. In exemplary embodiments, account registration requests are marked as being known to be abusive (which is discussed above). At a later time, when the user is then suspected of abusive activity, the disclosed system utilizes the prior knowledge gained from the initial marking as "abusive" to take immediate and pre-emptive action. In exemplary embodiments, the account is deactivated immediately. In some alternative embodiments, the account registration may be denied at the time of the account registration/creation request. For example, a situation in which account registration would be denied at time of the registration request is when the volumes are so high as to cause poor service to legitimate users, or to protect the infrastructure of the system and/or network.

FIG. 7 is a block diagram illustrating an internal architecture of a computing device, e.g., a computing device such as server or user computing device, in accordance with one or more embodiments of the present disclosure. FIG. 7 illustrates a computer system upon which some exemplary embodiments of the present disclosure may be implemented. Although computer system 700 is depicted with respect to a particular device or equipment, it is contemplated that other devices or equipment (e.g., network elements, servers, processors) within can deploy the illustrated hardware and components of system 700.

As shown in FIG. 7, internal architecture 700 includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer-executable process steps, incorporating functionality described herein, e.g., one or more of process flows described herein. CPU 712 first loads computer-executable process steps from storage, e.g., memory 704, computer-readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

As discussed herein, a "username" is an identifier that may be composed of letters, numbers or symbols (collectively defined as alpha-numeric characters) that is used to gain access to, and uniquely identify, an account and/or a network. Generally, but not always, a unique username will be selected by the user that initially registers for use of a message account. Typically, a domain name identifies the provider of the message account for the user, and which is appended to the username and separated by the "@" symbol.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a computing device, a new account registration request from a user, said registration request comprising user provided registration information associated with the user;
   extracting, via the computing device, features of the user provided registration information; and
   examining, via the computing device, said features to determine whether said request is for a legitimate or abusive purpose, said examination comprising comparing said features against labeled information associated with an existing account, said labeled information corresponding to a multi-dimensional feature vector associated with raw data collected from the existing account,
      when said features are determined to correspond to an abusive purpose, deny said account registration request, and
      when said features are determined to correspond to a legitimate purpose, grant said account registration request.

2. The method of claim 1, wherein said raw data comprises user activity data associated with said existing account, said user activity data being extracted from said existing account.

3. The method of claim 2, wherein said multi-dimensional feature vector is based on an identified pattern of activity derived from said user activity data, said pattern providing an indication as to whether said existing account is legitimate or abusive, said labeled information comprising said indication.

4. The method of claim 1, further comprising analyzing said new account registration request based on said examination, said analysis comprises training a classifier with said determination of the purpose of the request.

5. The method of claim 4, further comprising updating the multi-dimensional feature vector based on said analysis of said new account registration, wherein said updating occurs continuously upon determinations of new account requests.

6. The method of claim 4, further comprising applying said updated multi-dimensional feature vector via the classifier to a subsequent account registration request.

7. The method of claim 6, wherein the classifier implements machine learning techniques in accordance with the multi-dimensional feature vector.

8. The method of claim 1, further comprising:
   labelling said new account registration request based on said examination; and
   updating an account database based on said labelling, said account database comprising user account information for user accounts on the network.

9. A non-transitory computer-readable storage medium tangibly encoded with computer-executable instructions, that when executed by a computer, perform a method comprising:
   receiving a new account registration request from a user, said registration request comprising user provided registration information associated with the user;
   extracting features of the user provided registration information; and
   examining said features to determine whether said request is for a legitimate or abusive purpose, said examination comprises comparing said features against labeled information associated with an existing account, said labeled information corresponding to a multi-dimensional feature vector associated with raw data collected from the existing account,
      when said features are determined to correspond to an abusive purpose, deny said account registration request, and
      when said features are determined to correspond to a legitimate purpose, grant said account registration request.

10. The non-transitory computer-readable storage medium of claim 9, wherein said raw data comprises user activity data associated with said existing account, said user activity data being extracted from said existing account.

11. The non-transitory computer-readable storage medium of claim 10, wherein said multi-dimensional feature vector is based on an identified pattern of activity derived from said user activity data, said pattern providing an indication as to whether said existing account is legitimate or abusive, said labeled information comprising said indication.

12. The non-transitory computer-readable storage medium of claim 9, further comprising analyzing said new account registration request based on said examination, said analysis comprises training a classifier with said determination of the purpose of the request.

13. The non-transitory computer-readable storage medium of claim 12, further comprising:
updating the multi-dimensional feature vector based on said analysis of said new account registration, wherein said updating occurs continuously upon determinations of new account requests; and
applying said updated multi-dimensional feature vector via the classifier to a subsequent account registration request.

14. The non-transitory computer-readable storage medium of claim 13, wherein the classifier implements machine learning techniques in accordance with the multi-dimensional feature vector.

15. The non-transitory computer-readable storage medium of claim 9, further comprising:
labelling said new account registration request based on said examination; and
updating an account database based on said labelling, said account database comprising user account information for user accounts on the network.

16. A system comprising:
at least one computing device comprising:
memory storing computer-executable instructions; and
one or more processors for executing said computer-executable instructions, comprising:
receiving a new account registration request from a user, said registration request comprising user provided registration information associated with the user;
extracting features of the user provided registration information; and
examining said features to determine whether said request is for a legitimate or abusive purpose, said examination comprises comparing said features against labeled information associated with an existing account, said labeled information corresponding to a multi-dimensional feature vector associated with raw data collected from the existing account,
when said features are determined to correspond to an abusive purpose, deny said account registration request, and
when said features are determined to correspond to a legitimate purpose, grant said account registration request.

17. The system of claim 16, wherein said raw data comprises user activity data associated with said existing account, said user activity data being extracted from said existing account.

18. The system of claim 17, wherein said multi-dimensional feature vector is based on an identified pattern of activity derived from said user activity data, said pattern providing an indication as to whether said existing account is legitimate or abusive, said labeled information comprising said indication.

19. The system of claim 16, further comprising:
analyzing said new account registration request based on said examination, said analysis comprises training a classifier with said determination of the purpose of the request, wherein the classifier implements machine learning techniques in accordance with the multi-dimensional feature vector;
updating the multi-dimensional feature vector based on said analysis of said new account registration, wherein said updating occurs continuously upon determinations of new account requests; and
applying said updated multi-dimensional feature vector via the classifier to a subsequent account registration request.

20. The system of claim 16, further comprising:
labelling said new account registration request based on said examination; and
updating an account database based on said labelling, said account database comprising user account information for user accounts on the network.

* * * * *